United States Patent [19]
Callaghan et al.

[11] Patent Number: 5,503,740
[45] Date of Patent: Apr. 2, 1996

[54] FILTER FUNNEL HAVING RELEASABLY MOUNTED RESERVOIR

[75] Inventors: Roberta L. Callaghan; Michael A. Cammack, both of Fort Collins, Colo.

[73] Assignee: Teledyne Industries, Inc., Fort Collins, Colo.

[21] Appl. No.: 309,024

[22] Filed: Sep. 20, 1994

[51] Int. Cl.⁶ .................................................. B01D 29/085
[52] U.S. Cl. ........................ 210/232; 210/455; 210/465; 210/482
[58] Field of Search .............................. 222/189; 210/232, 210/455, 464, 465, 466, 467, 468, 469, 470, 473, 474, 477

[56] References Cited

U.S. PATENT DOCUMENTS

| | | |
|---|---|---|
| 3,656,626 | 4/1972 | Sama . |
| 3,664,506 | 5/1972 | Meunier et al. . |
| 3,741,394 | 6/1973 | Defenbaugh . |
| 3,746,174 | 7/1973 | Watanabe . |
| 3,747,767 | 7/1973 | Hankammer . |
| 3,785,497 | 1/1974 | Giffard . |
| 3,799,352 | 3/1974 | McClive . |
| 3,879,292 | 4/1975 | McClive . |
| 3,950,253 | 4/1976 | Stern . |
| 3,951,812 | 4/1976 | Hsu . |
| 4,059,528 | 11/1977 | Grosshandler . |
| 4,061,573 | 12/1977 | Biron . |
| 4,065,392 | 12/1977 | Gammon . |
| 4,066,551 | 1/1978 | Stern . |
| 4,072,615 | 2/1978 | McConnell . |
| 4,107,046 | 8/1978 | Corder . |
| 4,111,813 | 9/1978 | Preus . |
| 4,162,979 | 7/1979 | Wahlefeld et al. . |
| 4,190,542 | 2/1980 | Hodgson et al. . |
| 4,212,743 | 7/1980 | Van Meter et al. . |
| 4,214,993 | 7/1980 | Forsythe et al. . |
| 4,265,760 | 5/1981 | Abel et al. . |
| 4,280,906 | 7/1981 | Liljegren . |
| 4,283,283 | 8/1981 | Zimmerman . |
| 4,301,010 | 11/1981 | Eddleman et al. ........................ 210/455 |
| 4,303,521 | 12/1981 | Lehmann . |
| 4,306,971 | 12/1981 | Hankammer . |
| 4,358,376 | 11/1982 | Moriuchi et al. . |
| 4,378,293 | 3/1983 | Duke . |
| 4,419,235 | 12/1983 | Sway . |
| 4,419,236 | 12/1983 | Hsu . |
| 4,436,623 | 3/1984 | Cullen et al. . |
| 4,457,843 | 7/1984 | Cullen et al. . |
| 4,464,261 | 8/1984 | Cullen et al. . |
| 4,483,769 | 11/1984 | Sherman . |
| 4,591,438 | 5/1986 | Tanabe et al. . |
| 4,605,499 | 8/1986 | Wise . |
| 4,606,823 | 8/1986 | Lucas, III . |
| 4,626,350 | 12/1986 | Reid . |
| 4,659,467 | 4/1987 | Spearman . |
| 4,680,116 | 7/1987 | Kamiwada et al. . |
| 4,689,147 | 8/1987 | Leoncavallo et al. .................. 210/455 |
| 4,695,379 | 9/1987 | Nohren, Jr. et al. . |
| 4,711,718 | 12/1987 | Nelson, Jr. . |
| 4,722,790 | 2/1988 | Cawley et al. . |
| 4,740,300 | 4/1988 | Tapella et al. . |
| 4,749,481 | 6/1988 | Wheatley . |
| 4,753,728 | 6/1988 | VanderBilt et al. . |
| 4,769,144 | 9/1988 | Nohren, Jr. . |
| 4,773,997 | 9/1988 | Butte . |
| 4,776,956 | 10/1988 | Gannaway . |
| 4,787,973 | 11/1988 | Ando et al. . |
| 4,798,672 | 1/1989 | Knight . |
| 4,814,078 | 3/1989 | Stern et al. . |

(List continued on next page.)

Primary Examiner—Robert A. Dawson
Assistant Examiner—W. L. Walker
Attorney, Agent, or Firm—Ralph F. Crandell; Lee R. Osman; Holland & Hart

[57] ABSTRACT

A filter apparatus includes a cylindrical reservoir with a pistol grip handle. A conical funnel is releasably mounted on the reservoir by quick release threads. A plurality of radially extending support ribs within the funnel support a porous filter disk secured between the reservoir and the funnel. A depending annular seal ring on the reservoir defines a sealing edge which engages the filter disk and seals it against a seal surface and seat on the interior surface of the funnel.

6 Claims, 5 Drawing Sheets

U.S. PATENT DOCUMENTS

| | | |
|---|---|---|
| 4,882,052 | 11/1989 | Peranio . |
| 4,944,876 | 7/1990 | Miller .................................... 210/455 |
| 4,969,996 | 11/1990 | Hankammer ........................... 210/470 |
| 4,994,185 | 2/1991 | Cullen et al. . |
| 5,076,922 | 12/1991 | DeAre . |
| 5,102,543 | 7/1992 | Burroughs . |
| 5,122,270 | 6/1992 | Ruger et al. . |
| 5,126,044 | 6/1992 | Magnusson . |
| 5,180,491 | 1/1993 | Polasky . |
| 5,182,018 | 1/1993 | Langston . |
| 5,215,659 | 6/1993 | Ando . |
| 5,252,206 | 10/1993 | Gonzalez . |
| 5,256,287 | 10/1993 | Underwood . |
| 5,269,921 | 12/1993 | Ruger et al. . |
| 5,269,922 | 12/1993 | Lin . |
| 5,271,837 | 12/1993 | Discepolo et al. . |
| 5,308,483 | 5/1994 | Sklar et al. ............................ 210/232 |

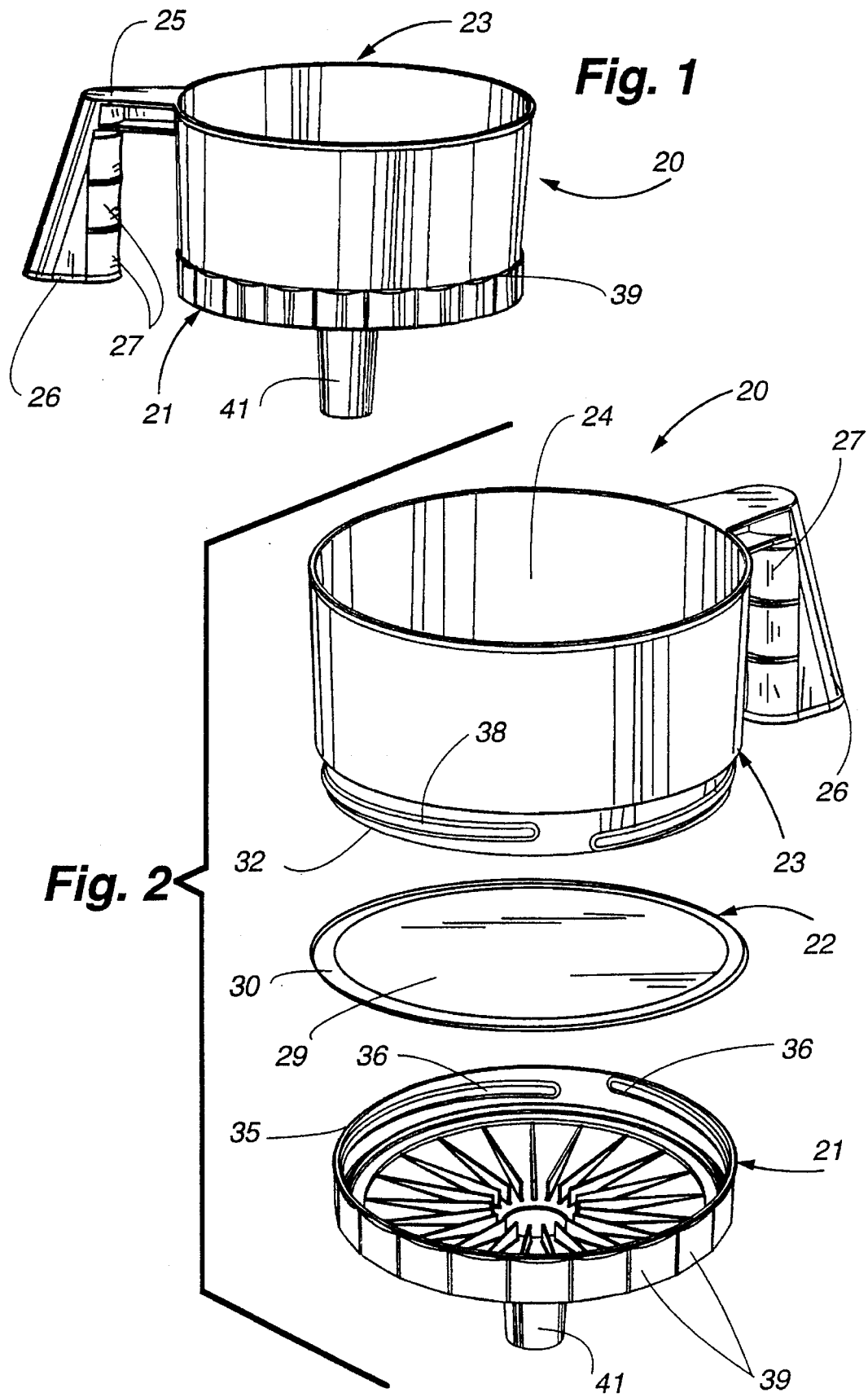

5,503,740

FILTER FUNNEL HAVING RELEASABLY MOUNTED RESERVOIR

BACKGROUND OF THE INVENTION

1. Field of the Invention

The present invention relates to filter funnel apparatus and more particularly to filter funnel devices finding particular, but not necessarily exclusive, utility for filtering potable water to provide higher quality drinking water.

2. Description of the Prior Art

Filter funnels with liquid containing reservoirs are well-known in the art and conventionally comprise a funnel with a liquid-containing cylindrical reservoir or container extending from the filter funnel to contain the liquid being filtered. A paper or disk filter within the reservoir and funnel filters the liquid. One illustrative type of filter funnel is a Buchner funnel utilized in chemical laboratories. Other filter funnels are the type conventionally utilized in coffee-making apparatus with a fluted cup type paper filter.

OBJECTS OF THE INVENTION

It is the principal object of the present invention to provide an improved filter apparatus for filtering liquids without leakage of unfiltered liquid into the filtrate.

It is another object to provide a filter apparatus of the foregoing character which is easy to assemble for use and disassemble for cleaning and changing the filter medium.

Other objects and advantages of the present invention will become apparent as the following description proceeds.

SUMMARY OF THE INVENTION

The present invention is embodied in a filter funnel having a cylindrical reservoir, a handle on the reservoir, and a conical funnel releasably mounted on the reservoir. A plurality of radially extending support ribs within the funnel support a porous filter disk secured between the reservoir and the funnel. An annular seal ring on the reservoir is sealingly engaged with a filter medium disk supported on the funnel and the disk is securely clamped between the reservoir and the funnel. The disk is of any appropriate filter material including unbleached paper pulp, or media paper, impregnated with activated charcoal or other filter media for providing the desired filter function. The seal between the reservoir, disk and funnel is formed by a seal ring on the bottom edge of the filter reservoir, which defines a sealing surface and edge engagable with a filter medium disk to pinch the disk to a sealing surface edge on the funnel. An annular rib or ring on the funnel defines a recess into which the filter disk is inserted. When a filter disk is placed between the funnel and the reservoir, the peripheral edge of the disk is sealed along a seal ring between the funnel and reservoir. The disk is pinched between sealing edges on the reservoir and filter and held tightly between the funnel and reservoir thereby precluding the escape of unfiltered liquid into the filtrate being produced through the filter medium.

DESCRIPTION OF THE DRAWINGS

FIG. 1 is a perspective view of a filter funnel apparatus embodying the present invention.

FIG. 2 is an enlarged exploded perspective view of the filter apparatus shown in FIG. 1.

DESCRIPTION OF THE PREFERRED EMBODIMENT

Figure 3:
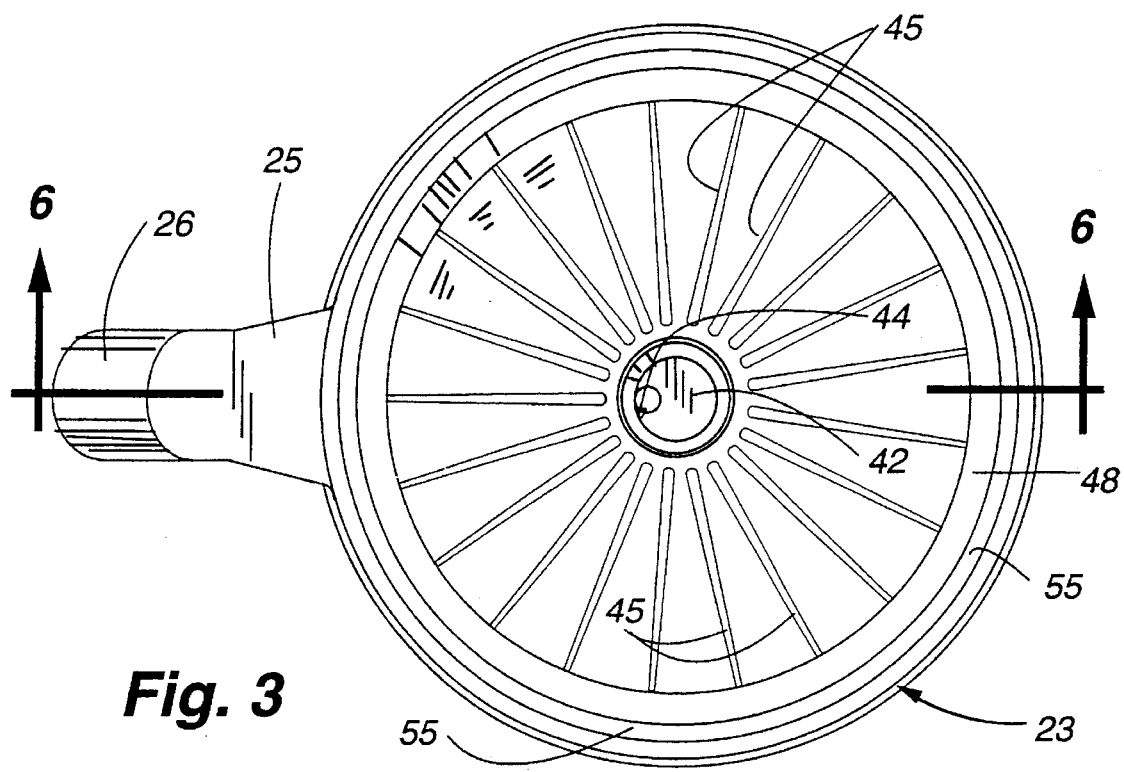
FIG. 3 is an enlarged top plan view of the filter apparatus shown in FIG. 1.
Figure 4:
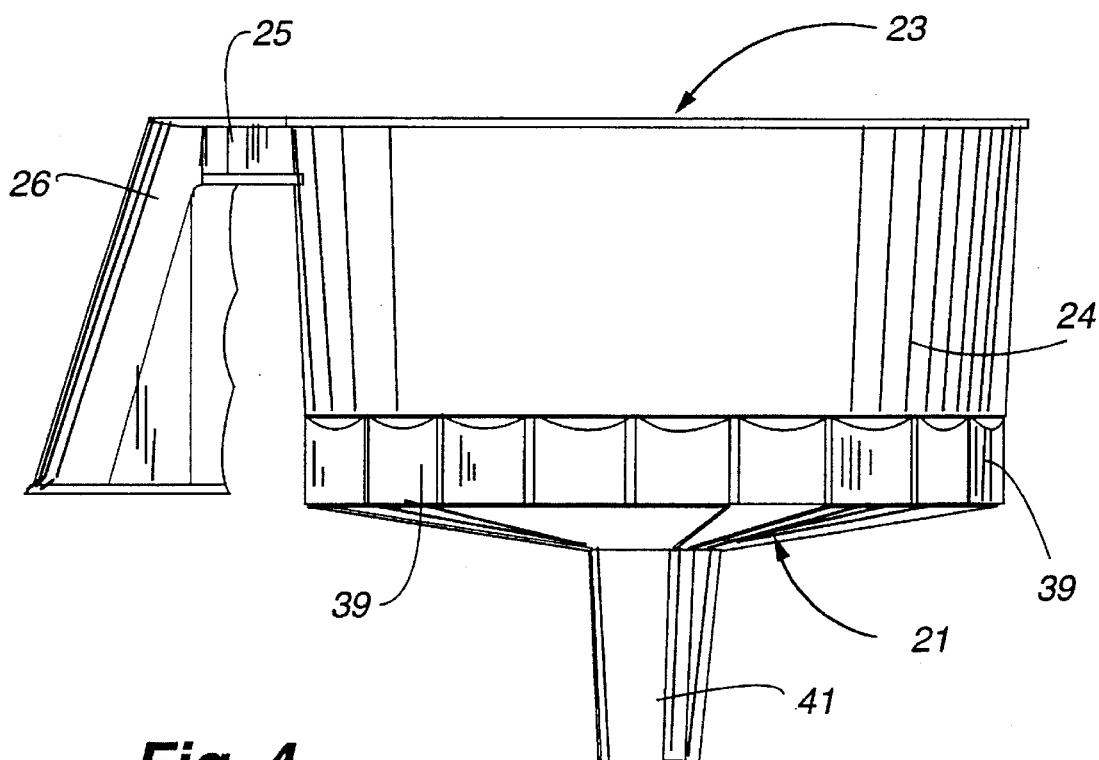
FIG. 4 is a side elevational view of the filter apparatus shown in FIG. 3.
Figure 5:
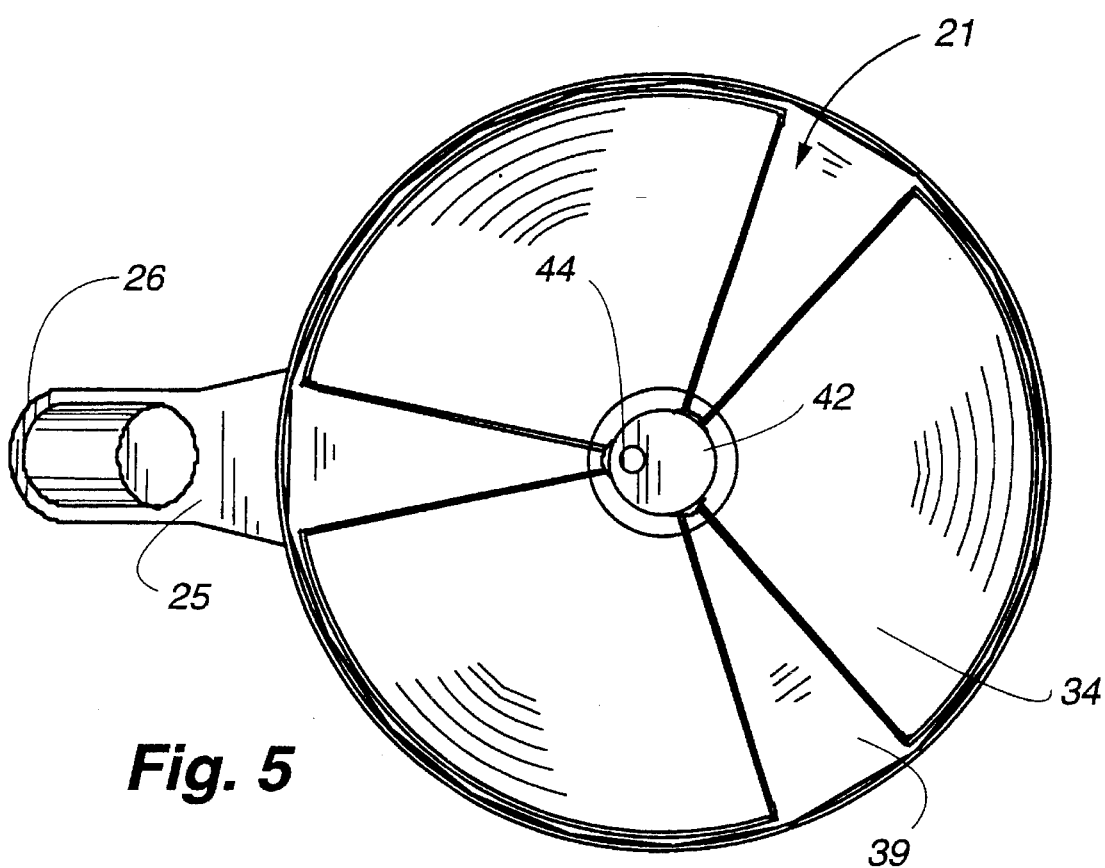
FIG. 5 is a bottom plan view of the filter apparatus shown in FIG. 3.

A filter funnel apparatus 20 embodying the present invention is formed by a funnel 21 which supports a filter medium disk 22 sealed thereto by a cylindrical reservoir 23 as shown in FIGS. 1 and 2. For handling the apparatus, an arm 25 extends radially from the upper edge of the reservoir 23 and supports a pistol grip handle 26 with appropriate finger recesses 28 for ease and comfort in handling. In its assembled form, the filter funnel apparatus 20 is placed on or held over an appropriate container (not shown) and liquid to be filtered is poured into the reservoir. The liquid flows slowly through the filter disk 22 into the funnel 21 and is filtered into the container for subsequent use. The handle 26 assists in assembling and disassembling the reservoir and funnel, and further provides a hook or stop when supporting the apparatus on a larger container.

The filter disk 22 may be of any appropriate composition and construction, commonly comprising one or more layers of filter paper 29 sealed together at their outer edges to provide a peripheral sealed ring 30. The filter disks may include various filter papers or other media impregnated with appropriate filter media or reagents, such as activated carbon and other materials, all of which are known in the art and do not form a part of the present invention. Some filter disks, for example, are capable of removing materials such as chlorine and sediment from drinking water which has been purified by the addition of bactericide chlorine reagents. Such reagents leave a distinctively unpleasant taste although the water is potable, and it is desirable to be able to remove such taste without affecting the potability of the water.

For sealing the filter reservoir 23 to the filter disk 22 and funnel 21, the cylindrical reservoir wall 24 is provided with a downwardly extending annular seal flange 32 with a sealing structure 33 on the lower edge thereof which sealingly engages a filter disk 22 and the funnel 21. The filter funnel 21 supports the filter disk 22 over the bottom opening of the reservoir and is formed by a conical base or pan 34 having an upstanding peripheral cylindrical flange 35 thereon with internal threads 36 adapted to engage corresponding external threads 38 on the annular reservoir seal flange 32. The threads may be of a rapidly connecting jar thread type configuration. Any other appropriate quick release but secure fastener may be utilized. Gripping flats 39 are provided on the external surface of the flange 35 to aid in holding the funnel during assembly and disassembly.

For draining filtered liquid from the filter apparatus, the conical funnel base 34 defines a central outlet opening 40 and an external outlet spout 41 extends downwardly therefrom centrally of the funnel pan 34. To control the rate of flow of liquid through the funnel, the outlet spout 41 may include an outlet wall 42 at its lower end defining an outlet aperture 44 of the desired size.

To support the filter disk 22 when wet during the filtering operation, the conical funnel base or pan 34 includes a plurality of radially extending ribs 45, the upper edges 46 of which define a generally horizontal plane. The ribs extend radially inwardly of the pan from an internal peripheral annular seal and support ring or ledge 47 defining a support surface 48 adjacent the threaded flange 35 with the plane of their upper edges spaced slightly below the plane of the annular seal surface 48.

Figure 6:
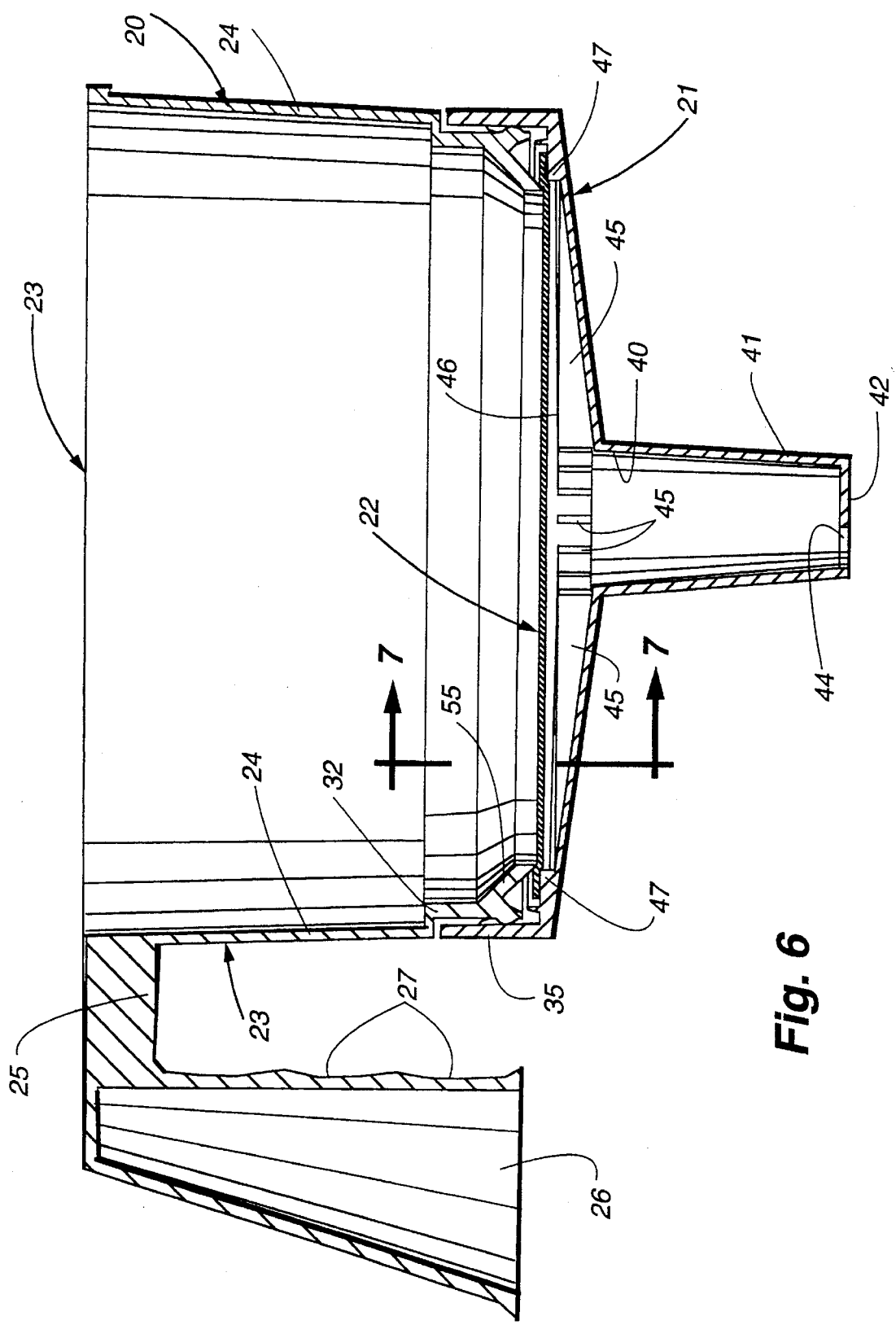
FIG. 6 is a section view taken substantially in the plane of line 6—6 on FIG. 3.

In order to provide a barrier between the filter reservoir 23 and the filter funnel 21, a sharply tapered ring wall 49 extends upwardly from the annular support surface 48 in juxtaposition with the lower internal edge 50 of the annular seal flange 32 on the reservoir 23. The ring wall 49 serves to center the filter disk 22 in the funnel when the disk is positioned over the ribs 45 with the peripheral edge area 52 of the seal 30 of the disk 22 overlying and supported on the annular support surface 48 of the funnel base 34 as shown in FIG. 6.

Figure 7:
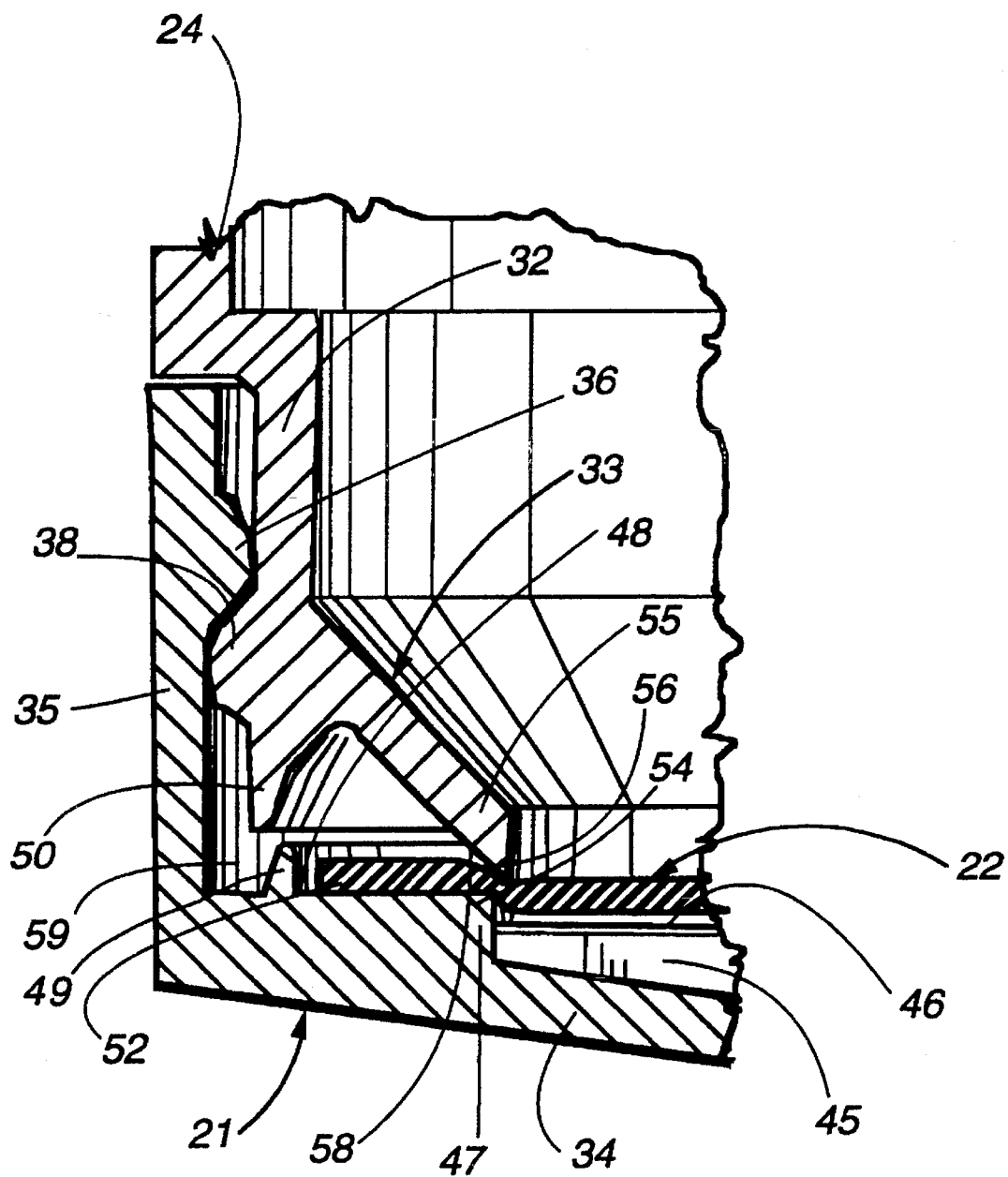
FIG. 7 is an enlarged section view taken substantially in the plane of line 7—7 on FIG. 6.

A water tight seal is provided between the disk, reservoir and funnel. To this end, the funnel seal ring 47 and support surface 48 defines an inner sealing edge 54. A downwardly and inwardly extending annular lip 55 on the reservoir seal flange 32 defines a lower seal edge 56 and adjacent seal surface 58. The seal edge 56 engages and bites into the peripheral edge area 52 while the seal surface 58 engages and compresses the filter disk against the inner sealing edge 54 and seals it tightly to the funnel, as shown in FIG. 7. In this way, when the funnel 21 is threadably engaged with the reservoir 23, the filter disk 22 is pinched tightly between the inner sealing edge 54 on the funnel and the downwardly and inwardly extending annular lip 55 on the reservoir.

In addition to the above-described seal between the reservoir 23, funnel 21 and disk 22, a seal may also be provided directly between the reservoir 23 and funnel 21. To this end, the lower edge of the depending seal flange 32 on the reservoir extends into a channel 59 defined between the ring wall 49 on the funnel and the peripheral cylindrical funnel flange 35. Sealing contact between the depending flange 32 and ring wall 49 may be obtained. Further, an O-ring or other seal (not shown) may be provided in the channel 59 for sealing engagement with the reservoir annular seal flange 32.

The advantages of the foregoing construction reside in the provision of a tightly sealed filter when the filter funnel and reservoir are secured together with the filter disk therebetween while allowing for readily disengaging the funnel from the reservoir for replacement of the filter disk. The structure precludes the leakage of liquid between the reservoir and funnel around the peripheral edges of the filter pad thereby insuring that all liquid is filtered through the filter pad thus preventing the leakage of unfiltered liquid into the filtrate.

While a certain illustrative embodiment of the present invention has been shown in the drawings and described above in considerable detail, it should be understood that there is no intention to limit the invention to the specific form disclosed. On the contrary, the intention is to cover all modifications, alternative constructions, equivalents and uses falling within the spirit and scope of the invention as expressed in the appended claims.

We claim:

1. A filter apparatus comprising a cylindrical reservoir, a conical funnel releasably mounted on said reservoir, a porous filter disk secured between said reservoir and said funnel, a depending annular seal flange on said reservoir, said seal flange defining a reservoir sealing edge and a sealing surface, said funnel defining a sealing edge, said funnel sealing edge being adapted for sealing engagement with said filter disk and said reservoir sealing edge and said sealing surface for sealing said funnel filter disk, and reservoir in watertight relation.

2. A filter apparatus comprising a cylindrical reservoir, a handle on said reservoir, a conical funnel releasably mounted on said reservoir and having a funnel base defining an internal peripheral annular support ring within said funnel, said ring defining an annular support surface and an inner sealing edge, a plurality of support ribs on said funnel base within said funnel and extending inwardly from said support ring, a porous filter disk secured between said reservoir and said funnel having a peripheral area supported on said support surface, a depending annular lip on said reservoir defining a sealing edge and sealing surface, said filter disk being sealingly pinched between said inner sealing edge of said support surface and said annular lip sealing edge and sealing surface whereby a watertight seal is formed between said reservoir, said filter disk and said funnel.

3. A filter apparatus comprising a cylindrical reservoir, a handle on said reservoir, an externally threaded depending annular flange on said reservoir defining an inwardly sloping annular lip having a sealing edge, a shallow conical funnel pan having an internally threaded upstanding peripheral cylindrical flange thereon, an annular ring on said conical pan defining a support surface adjacent to said flange and a lower internal sealing edge spaced from said flange, said funnel pan defining a central discharge opening, a spout communicating with said discharge opening and depending from said funnel pan, said spout defining a discharge opening in its lower end, an upstanding rib on said annular ring concentric with said discharge opening and spaced peripherally inwardly from said upstanding peripheral cylindrical flange, a plurality of internal ribs integral with said pan and extending between said annular ring and said discharge opening, and a porous filter disk secured between said reservoir and said funnel pan when said upstanding peripheral cylindrical flange is threadably engaged with said depending annular flange, said filter disk being centered over said discharge opening by said upstanding rib and supported on said support surface and said internal ribs and sealed to said funnel internal sealing edge by said reservoir annular lip whereby a watertight seal is formed between said reservoir, said filter disk and said funnel pan when said annular seal flange is threadably engaged with said funnel flange.

4. A filter apparatus as defined in claim 1, wherein:

said seal flange defining a downwardly and inwardly extending annular lip, said lip forming said reservoir sealing edge and an adjacent seal surface;

said funnel defining a funnel seal and support ring having a support surface, said funnel seal and support ring defining said funnel sealing edge;

said filter disk defining a peripheral area; and said peripheral area of said filter disk resting on said support surface, and said filter disk being sealingly pinched between said funnel sealing edge and said sealing surface whereby a watertight seal is formed between said reservoir, said filter disk and said funnel.

5. A filter apparatus as defined in claim 2, wherein said support ribs extend radially inwardly from said support ring.

6. A filter apparatus comprising:

a cylindrical reservoir;

a conical funnel releasably mounted on said reservoir;

a porous filter disk secured between said reservoir and said funnel, said filter disk defining a peripheral area;

a depending annular seal flange on said reservoir, said seal flange defining a reservoir sealing edge, said seal flange defining a downwardly and inwardly extending annular lip, said lip forming said seal edge and an adjacent sealing surface;

said funnel defining a sealing edge, said funnel defining a funnel seal and support ring having a support surface, said funnel seal and support ring defining said funnel sealing edge;

said peripheral area of said filter disk resting on said support surface; and said filter disk being sealingly pinched between said funnel sealing edge and said sealing surface whereby a watertight seal is formed between said reservoir, said filter disk and said funnel.

* * * * *